United States Patent
Hirano et al.

(10) Patent No.: US 7,663,797 B2
(45) Date of Patent: *Feb. 16, 2010

(54) MULTICOLOR DISPLAY ELEMENT

(75) Inventors: Shigenobu Hirano, Yokohama (JP); Takuji Kato, Yokohama (JP); Hiroyuki Takahashi, Yokohama (JP); Ikue Kawashima, Yokohama (JP); Takeshi Shibuya, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 11/856,311

(22) Filed: Sep. 17, 2007

(65) Prior Publication Data

US 2008/0013152 A1  Jan. 17, 2008

Related U.S. Application Data

(63) Continuation of application No. 11/540,763, filed on Oct. 2, 2006, now Pat. No. 7,333,259, which is a continuation of application No. PCT/JP2005/009108, filed on May 12, 2005.

(30) Foreign Application Priority Data

May 14, 2004 (JP) ............................ 2004-144829
Sep. 13, 2004 (JP) ............................ 2004-265054

(51) Int. Cl.
*G02F 1/15* (2006.01)
*G02F 1/153* (2006.01)

(52) U.S. Cl. ........................................ 359/265; 359/270

(58) Field of Classification Search ................ 359/237, 359/238, 240, 242, 245, 247, 265, 267, 270, 359/726

See application file for complete search history.

(56) References Cited

U.S. PATENT DOCUMENTS

| 4,550,982 | A | 11/1985 | Hirai |
| 7,029,833 | B2 | 4/2006 | Takahashi et al. |
| 7,333,259 | B2 * | 2/2008 | Hirano et al. ............... 359/265 |
| 2005/0046920 | A1 | 3/2005 | Freeman et al. |
| 2005/0270619 | A1 | 12/2005 | Johnson et al. |
| 2006/0139724 | A1 | 6/2006 | Liang et al. |
| 2006/0204866 | A1 | 9/2006 | Hirano et al. |
| 2006/0215250 | A1 | 9/2006 | Shibuya et al. |

FOREIGN PATENT DOCUMENTS

| JP | 59-219779 | 12/1984 |
| JP | 64-39086 | 2/1989 |
| JP | 10-161161 | 6/1998 |
| JP | 2003-121863 | 4/2003 |

\* cited by examiner

*Primary Examiner*—William C Choi
(74) *Attorney, Agent, or Firm*—Oblon, Spivak, McClelland, Maier & Neustadt, L.L.P.

(57) ABSTRACT

Multicolor display elements are disclosed that are adapted to full color electric papers, which comprises a display electrode, counter electrode, electrolyte, and display layer, wherein the counter electrode is disposed oppositely to the display electrode, the electrolyte is filled into a space provided between the display electrode and the counter electrode, the display layer is disposed on the surface, which faces the counter electrode, of the display electrode, the display layer contains plural electrochromic compositions in a condition that the plural electrochromic compositions are separated into plural layers within the display layer or are mixed together within the display layer, and at least one of threshold voltage for coloring condition and threshold voltage for decoloring condition, or at least one of charge amount required for coloring into a sufficient color density and charge amount required for sufficiently decoloring, are substantially different each other between the plural electrochromic compositions.

23 Claims, 3 Drawing Sheets

MULTICOLOR DISPLAY ELEMENT

CROSS-REFERENCE TO RELATED APPLICATIONS

This is a continuation of U.S. application Ser. No. 11/540,763, filed Oct. 2, 2006, which was a continuation of Application No. PCT/JP2005/009108, filed on May 12, 2005, the entire contents of each of which are hereby incorporated by reference.

BACKGROUND OF THE INVENTION

1. Field of the Invention

The present invention relates to multicolor display elements.

2. Description of the Related Art

Recently, electric papers are commercially expected as new reading and writing media in place of conventional papers. As for the electric papers, various properties or items are demanded such as higher white reflectance, higher contrast ratio, highly fine and precise images, relatively thin, lightweight, and inexpensive; and also the electric papers are of reflective type, the displayed information can be memorized, and the electric papers can be driven at lower voltages. In particular, the white reflectance and the contrast ratio are required to be as high as those of conventional papers.

Previously, reflective liquid crystals, electrophoretic elements, toner migration elements, and the like have been proposed as the candidate of electric paper. However, these proposed devices suffer from lower white reflectance. Moreover, color filters are necessary in order to provide multicolor displays from these display devices. When color filters are employed, the reflective light quantity is remarkably reduced, since color filters themselves absorb light and also one pixel should be divided into three parts of red, green, and blue, thus resulting in significantly poor visuality.

There exist a phenomenon of so-called electrocromism in which a color of a material is changed reversibly by reaction of electric oxidation and/or electric reduction. Electrochromic compounds, capable of undergoing such electrocromism, are expected to be useful for electric papers since electrochromic display elements based on the coloring and decoloring of electrochromic compounds can provide a reflective display, the displayed information can be memorized, and the electrochromic display elements can be driven at lower voltages. Further, the electrochromic display elements are expected as multicolor display elements since various colors can be displayed corresponding to the material configurations or constitutions.

As for multicolor displays utilizing electrochromic multicolor display elements in the prior art, Japanese Patent Application Publication No. 01-39086 discloses a multicolor display element in which plural species of electrochromic compounds are attached to a polymer. More specifically, in the disclosure of Japanese Patent Application Publication No. 01-39086, an electrochromic compound capable of coloring by an oxidation reaction and an electrochromic compound capable of coloring by a reduction reaction are attached to a polymer. In this configuration, one of the electrochromic compounds can be colored; however, both of the electrochromic compounds cannot be colored simultaneously.

Japanese Patent Application Laid-Open No. 10-161161 discloses a multicolor display formed by combining a specific electrochromic composition and an electrophoretic effect. The disclosed display can provide three primary colors, however, is not suited to display full color since colors cannot be mixed by way of laminating layers.

Japanese Patent Application Laid-Open No. 2003-121883 discloses a display element in which plural species of electrochromic compositions are laminated in order of the threshold voltages corresponding to the electrochromic colorings from higher or lower. However, the element is not adapted to full color since respective electrochromic compositions cannot be individually colored by merely adjusting the threshold voltages. Further, Japanese Patent Application Laid-Open No. 2003-121883 discloses no specific examples concerning the display element.

SUMMARY OF THE INVENTION

It is an object of the present invention to provide multicolor display elements that are easily changed the colors and are adapted to full color electric papers.

The object of the present invention may be attained by the multicolor display element according to the present invention, which comprises a display electrode, a counter electrode, an electrolyte, and a display layer, wherein the counter electrode is disposed oppositely to the display electrode, the electrolyte is filled into a space provided between the display electrode and the counter electrode, the display layer is disposed on the surface, which faces the counter electrode, of the display electrode, the display layer contains plural electrochromic compositions in a condition that the plural electrochromic compositions are separated into plural layers within the display layer or are mixed together within the display layer, and at least one of threshold voltage for coloring condition, threshold voltage for decoloring condition, charge amount required for coloring into a sufficient color density, and charge amount required for sufficiently decoloring, are substantially different each other between the plural electrochromic compositions.

The present invention may represent significant effects that multicolor display elements can be provided that are easily changed the colors and are adapted to full color electric papers.

BEST MODE FOR CARRYING OUT THE INVENTION

The multicolor display element according to the present invention comprises a display electrode, a counter electrode, an electrolyte, and a display layer, wherein the counter electrode is disposed oppositely to the display electrode, the electrolyte is filled into a space provided between the display electrode and the counter electrode, the display layer is disposed on the surface, which faces the counter electrode, of the display electrode, the display layer contains plural electrochromic compositions in a condition that the plural electrochromic compositions are separated into plural layers within the display layer or are mixed together within the display layer, and at least one of threshold voltage for coloring condition, threshold voltage for decoloring condition, charge amount required for coloring into a sufficient color density, and charge amount required for sufficiently decoloring, are substantially different each other between the plural electrochromic compositions.

The multicolor display elements according to the present invention may display plural colors corresponding to the voltage and/or charge amount applied to the element, thereby various colors can be achieved.

In general, for the purpose of displaying plural colors by use of display elements, plural electrochromic compositions should be incorporated into the display element by way of laminating or mixing for example, and the plural electrochromic compositions should be individually colored or decolored. More specifically, the plural electrochromic compositions should be controlled depending on the threshold voltages for coloring, threshold voltages for decoloring, charge amounts required for coloring into sufficient color density, and/or charge amounts required for sufficiently decoloring by way of appropriately applying voltages and/or charge amounts, instead of merely providing plural electrochromic compositions within the display element.

Figure 1:
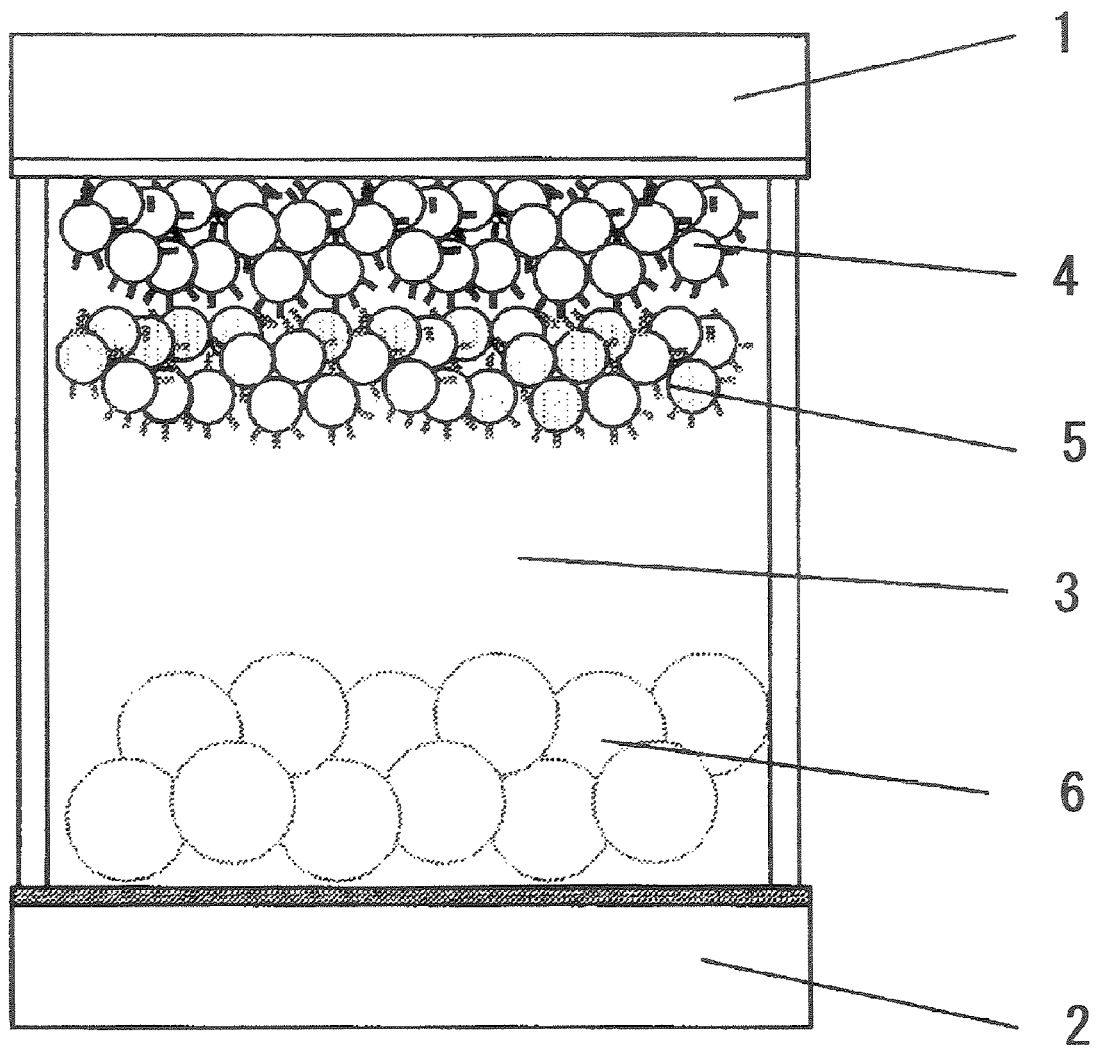
FIG. 1 is a schematic view that exemplarily illustrates a constitution of a multicolor display element according to the present invention.

As shown exemplarily in FIG. 1, the multicolor display element according to the present invention is constructed from display electrode 1, counter electrode 2 disposed oppositely to the display electrode 1 with a space between them, electrolyte 3 interposed between the two electrodes, and a first display layer 4 as well as a second display layer 5 that are colored differently each other. The multicolor display element according to the present invention may also comprise white reflective layer 6.

In a preferable aspect of the multicolor display element according to the present invention, the plural electrochromic compositions are capable of coloring differently each other, and represent the following relations:

$$|Vc(E1)|>|Vc(E2)|> \ldots >|Vc(Ei)|> \ldots >|Vc(En)|, \text{ and}$$

$$|Qc(E1)|<|Qc(E2)|< \ldots <|Qc(Ei)|< \ldots <|Qc(En)|$$

Ei: "i" th electrochromic composition,
n: total number of electrochromic compositions,
Vc(Ei): threshold voltage for coloring condition in terms of "i" th electrochromic composition,
Qc(Ei): charge amount required for coloring into sufficient color density in terms of "i" th electrochromic composition.

On the following grounds, the configuration of the multicolor display element described above provides conditions that plural electrochromic compositions can be colored independently.

A display layer is assumed that contains electrochromic composition A of which the threshold voltage for coloring is higher and the charge amount required for coloring is smaller and electrochromic composition B of which the threshold voltage for coloring is lower and the charge amount required for coloring is larger. When a voltage is applied to the display layer that is above the threshold voltage of electrochromic composition B and below the threshold voltage of electrochromic composition A, only electrochromic composition B is colored. In addition, when a voltage is applied for a short period to the display layer that is above the threshold voltage of electrochromic composition A, electrochromic composition A is colored; however, electrochromic composition B is scarcely colored since the charge amount required for coloring is larger and the charging period is short. As such, electrochromic compositions A and B can be colored independently. Further, when electrochromic compositions A and B are made color simultaneously, the mixed color of electrochromic compositions A and B can be obtained. The conditions described above can extend to three or more colors; that is, three species of electrochromic compositions of yellow, magenta, and cyan can bring about the full color display.

In another preferable aspect of the multicolor display element according to the present invention, the plural electrochromic compositions are capable of coloring differently each other, and represent the following relations:

$$Vc(E1)>Vc(E2)> \ldots >Vc(Ei)> \ldots >Vc(En)>$$

$$Vd(En)> \ldots >Vd(Ei)> \ldots >Vd(E2)>Vd(E1)$$

Ei: "i" th electrochromic composition,
n: total number of electrochromic compositions,
Vc(Ei): threshold voltage for coloring condition in terms of "i" th electrochromic composition,
Vd(Ei): threshold voltage for decoloring condition in terms of "i" th electrochromic composition.

On the following grounds, the configuration of the multicolor display element described above provides conditions that plural electrochromic compositions can be colored independently corresponding to the applied voltages.

Figure 2:
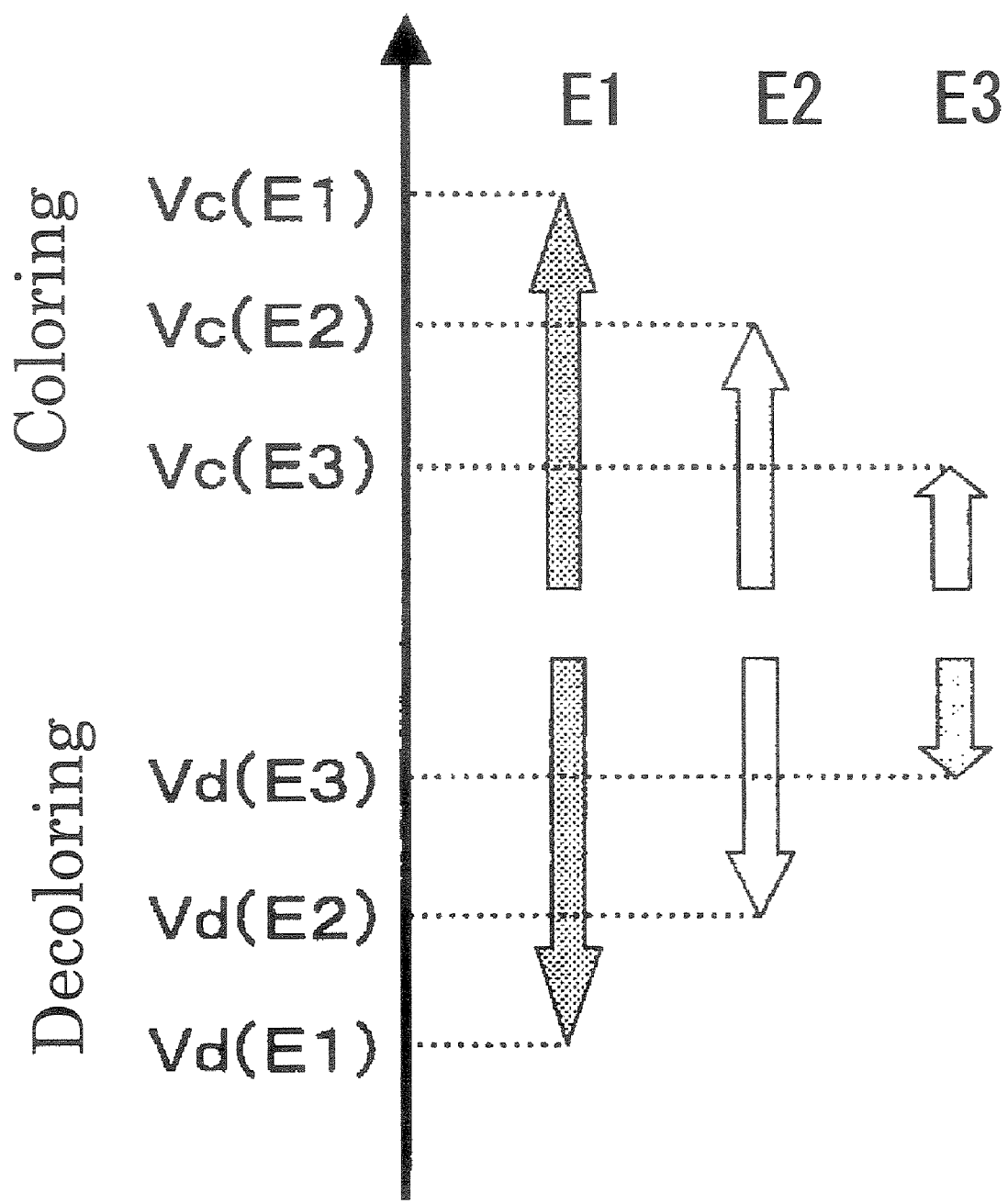
FIG. 2 is a schematic view that shows exemplary combinations of threshold voltages for coloring and decoloring a multicolor display element according to the present invention.

A display layer is assumed that contains electrochromic compositions of E1, E2, and E3 and the relations of Vc and Vd are Vc(E1)>Vc(E2)>Vc(E3)>Vd(E3)>Vd(E2)>Vd(E1) as shown in FIG. 2. When a voltage of Vc1, wherein Vc1≧Vc(E1), is applied to the display element, all electrochromic compositions of E1, E2, and E3 are colored. Then, when a voltage of Vc2, wherein Vd(E1)<Vd2≦Vd(E2), is applied to the display element, E2 and E3 are decolored, namely, only E1 can be made color selectively. Further, when a voltage of Vc2, wherein Vc(E1)>Vc2≧Vc(E2), is applied to the display element, E2 and E3 is colored; in addition, when a voltage of Vd3, wherein Vd(E2)<Vd3≦Vd(E3), is applied to the display element, only E3 is decolored, namely, only E2 can be made color selectively. Further, when a voltage of Vc3, wherein Vc(E2)>Vc3≧Vc(E3), is applied to the display element, only E3 is colored.

As such, all electrochromic compositions of E1, E2, and E3 can be made color independently. When three species of electrochromic compositions of yellow, magenta, and cyan are employed, the full color display can be obtained.

In another preferable aspect of the multicolor display element according to the present invention, the plural electrochromic compositions are capable of coloring differently each other, and represent the following relations:

$$Vc(E1)<Vc(E2)< \ldots <Vc(Ei)< \ldots <Vc(En)<$$

$$Vd(En)< \ldots <Vd(Ei)< \ldots <Vd(E2)<Vd(E1)$$

Ei: "i" th electrochromic composition,
n: total number of electrochromic compositions,
Vc(Ei): threshold voltage for coloring condition in terms of "i" th electrochromic composition,
Vd(Ei): threshold voltage for decoloring condition in terms of "i" th electrochromic composition.

Figure 3:
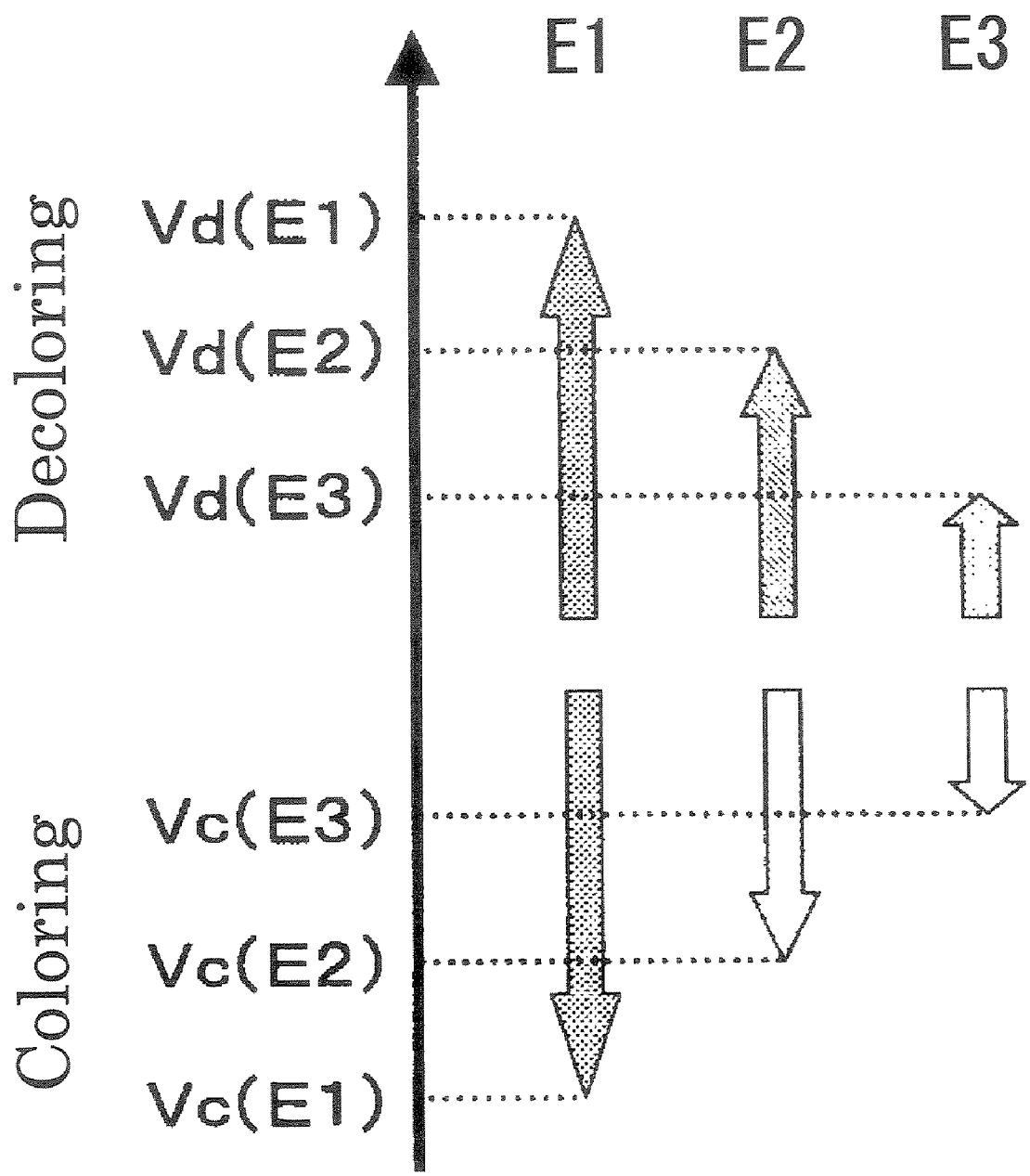
FIG. 3 is another schematic view that shows exemplary combinations of threshold voltages for coloring and decoloring a multicolor display element according to the present invention.

The configuration of the multicolor display element described above provides conditions that plural electrochromic compositions can be colored independently corresponding to the applied voltages. The grounds will be apparent from the immediately above descriptions and FIG. 3.

In another preferable aspect of the multicolor display element according to the present invention, the plural electrochromic compositions are capable of coloring differently each other, and represent the following relations:

$$|Vc(E1)|>|Vc(E2)|> \ldots >|Vc(Ei)|> \ldots >|Vc(En)|, \text{ and}$$

$$|Qc(E1)|>|Qc(E2)|> \ldots >|Qc(Ei)|> \ldots >|Qc(En)|$$

Ei: "i" th electrochromic composition, n: total number of electrochromic compositions, Vc(Ei): threshold voltage for coloring condition in terms of "i" th electrochromic composition, Qc(Ei): charge amount required for sufficiently decoloring in terms of "i" th electrochromic composition.

On the following grounds, the configuration of the multicolor display element described above provides conditions that plural electrochromic compositions can be colored independently corresponding to the voltages and charge amounts.

A display layer is assumed that contains electrochromic compositions E1 and E2. When a voltage of Vc1, wherein Vc(E1)>Vc1≧Vc(E2), is applied to the display element, only the electrochromic composition of E2 is colored. When a voltage of Vc2, wherein Vc2>Vc(E1)≧Vc(E2), is applied to the display element, E1 and E2 are colored. Then, when a voltage for decoloring is applied to the display element that is reversible from the voltage for coloring, only E2 can be made decolor, since the charge amount required for sufficiently decoloring E2 is smaller than that of E1; namely only E1 can be made color.

When three species of electrochromic compositions of yellow, magenta, and cyan are employed, the full color display can be obtained.

In another preferable aspect of the multicolor display element according to the present invention, the plural electrochromic compositions are capable of coloring differently each other, and represent the following relations:

$$|Qc(E1)|>|Qc(E2)|> \ldots >|Qc(Ei)|> \ldots >Qc(En)|, \text{ and}$$

$$|Qc'(E1)|>|Qc'(E2)|> \ldots >|Qc'(Ei)|> \ldots >|Qc'(En)|$$

Ei: "i" th electrochromic composition, n: total number of electrochromic compositions, Qc(Ei): charge amount required for coloring into sufficient color density in terms of "i" th electrochromic composition, Qc'(E1): charge amount required for sufficiently decoloring in terms of "i" th electrochromic composition.

On the following grounds, the configuration of the multicolor display element described above provides conditions that plural electrochromic compositions can be colored independently corresponding to charge amounts.

A display layer is assumed that contains electrochromic compositions E1 and E2. When a voltage is applied to the display element for a period that leads to charging Qc1, wherein Qc(E1)>Qc1>Qc(E2), to the display element, only the electrochromic composition of E2 is colored. When a voltage is applied for a period that leads to charging of Qc2, wherein Qc2>Qc(E1)≧Qc(E2), E1 and E2 are colored. Then, when a voltage for decoloring is applied for an appropriate period to the display element that is reversible from the voltage for coloring, only E2 can be made decolor, since the charge amount required for sufficiently decoloring E2 is smaller than that of E1; namely only E1 can be made color. Then, when a voltage is applied for an appropriate period that is sufficient for decoloring E1, E1 and E2 can be made decolor.

When three species of electrochromic compositions of yellow, magenta, and cyan are employed, the full color display can be obtained.

Preferably, the electrochromic composition in the present invention is formed of electrical conductive (hereinafter, referring to as "conductive") or semiconductive fine particles that bear an organic electrochromic compound. More specifically, the electrochromic composition may be comprised of conductive or semiconductive fine particles having a particle size of 5 to 50 nm for example, and an organic electrochromic composition having a polar group such as phosphonyl, hydroxyl, and carboxyl groups that is adsorbed on the fine particles.

In such configuration of the electrochromic composition, the charge can travel from the display electrode to the electrochromic composition by the way of the conductive or semiconductive fine particles. Therefore, selecting the species of fine particles or adjusting the interface condition between the fine particles and the electrochromic compound can control the threshold voltage. Further, the organic compound as the electrochromic compound can be variously designed as to the molecule structure such as controlling the electron mobility by changing the conjugated structure of interface and/or chromophore sites, thereby changing the charge amount required for sufficiently decoloring or changing into various colors.

Accordingly, the plural electrochromic compositions may be formed of plural species of conductive or semiconductive fine particles, of which conductive properties are different each other, that bear plural organic electrochromic compounds capable of coloring differently each other; and thus various electrochromic compositions may be easily prepared that have different threshold voltages for coloring and decoloring, and/or different charge amounts required for coloring into sufficient color density.

The conductive or semiconductive fine particles in the present invention may be altered in terms of the conductive properties by modifying the surface of the fine particles. Threshold voltages for coloring and decoloring of electrochromic compounds can be adjusted by selecting conductive properties of fine particles as described above. The conductive properties of fine particles can be altered by modifying the surface of fine particles using various materials, compounds, molecules, and the like. For example, fine particles of metal oxides such as titanium oxide fine particles can be easily coated with other metal oxides such as aluminum oxide, silicon oxide, and zirconium oxide by means of sol-gel process for example. By modifying the surface of the fine particles, conductive properties of fine particles can be easily controlled by the species and/or material for modifying, the threshold voltages for coloring and decoloring can be effectively adjusted.

Preferably, the display layer in the multicolor display element according to the present invention is formed into an optional pattern. The multicolor display element according to the present invention can be partially colored by applying a voltage at a partial area, even when the display layer is provided over the entire surface of the display electrode having a transparent electrode. However, the coloring images tend to appear fuzzy a little due to a possible charge diffusion. The fuzzy due to the charge diffusion may be prevented and clear coloring images may be obtained by providing every pixels of the display layer with highly fine and precise patterning, thereby multicolor display elements can be provided that display highly fine and precise images.

Preferably, a white reflective layer is provided to the multicolor display element according to the present invention between the display electrode and the counter electrode. The display layer of the multicolor display element according to the present invention undergoes reversible color changes between transparent and coloring conditions, therefore, the whiteness level of the reflective display element depends on the properties of the white reflective layer. The material formed of a resin and white particles dispersed therein may easily present a reflective layer with a whiteness level as high as that of conventional papers, thereby reflective multicolor display elements can be provided with higher whiteness level.

As for another method to provide the higher whiteness level, the fine pigment particles dispersed into the electrolyte may be utilized. Preferably, the fine pigment particles are dispersed into the electrolyte, and the electrolyte containing the fine pigment particles is injected into the display element. Due to the method, the electric conductivity of the display element is relatively high since the resin for binding does not exist; therefore, the display element can be activated at lower voltages; namely, reflective display elements are provided with lower activating voltages. The fine pigment particles may be of conventional metal oxides, specific examples thereof include titanium oxide, aluminum oxide, zinc oxide, silicon oxide, cesium oxide, and yttrium oxide.

The multicolor display elements according to the present invention are suited to active driving. In order to form fine and precise images on a display of approximately A4 size, the control should be carried out using an active driving element. The multicolor display elements according to the present invention can be easily subjected to active driving by disposing an active driving element on one of a substrate of the display electrode and a substrate of the counter electrode, thereby the display may be provided with fine and precise images and larger area.

EXAMPLES

Hereinafter, the present invention will be described specifically by way of examples, but it should be understood that the present invention is not limited thereto. All of % and parts in terms of ingredients are by mass unless indicated otherwise.

Example 1

Initially, a display electrode was prepared as follows: 1-benzyl-1'-(2-phosphonoethyl)-4,4'-bipyridinium dibromide (hereinafter, referring to as "EC1") as an electrochromic compound was dissolved into water to prepare an aqueous solution of EC1 having a concentration of 0.02 mole/liter. Then, titanium oxide fine particles having a primary particle size of 6 nm were dispersed into the aqueous solution of EC1 and also a small amount of surfactant was added to prepare an aqueous dispersion of titanium oxide fine particles, thereby causing adsorption of EC1 onto the titanium oxide fine particles. The amount of the titanium oxide fine particles was 20% by mass in the aqueous solution of EC1.

Further, 1-ethyl-1'-(3-phosphonopropyl)-4,4'-bipyridinium dichloride (hereinafter, referring to as "EC2") as an electrochromic compound was dissolved into ethanol to prepare an ethanol solutions of EC2 having a concentration of 0.02 mole/liter. Then, zirconium oxide fine particles having a primary particle size of 30 nm were dispersed into the ethanol solution of EC2 and also a small amount of surfactant was added to prepare an ethanol dispersion of zirconium oxide fine particles, thereby causing adsorption of EC2 onto the zirconium oxide fine particles. The amount of the zirconium oxide fine particles was 20% by mass in the ethanol solution of EC2.

Separately, a glass substrate was employed on the entire surface of which was coated with a transparent electrode film of tin oxide. The dispersion of titanium oxide fine particles was coated on a part of the glass substrate of 1 cm$^2$ area to a thickness of about 2 μm by a spin coating method, and was subjected to heating at 150° C. for 24 hours. After allowing to cool to room temperature, the dispersion of zirconium oxide fine particles was coated over the same area as the titanium oxide fine particles on the glass substrate to a thickness of about 2 μm by a spin coating method, and was subjected to heating at 150° C. for 24 hours. As a result, a transparent electrode film was obtained on the glass substrate.

A counter electrode was prepared as follows: 5 grams of titanium oxide particles having a primary particle size of 300 nm and 1 gram of a polyethylene resin were dispersed into 10 mililiters of tetrahydrofuran to prepare a dispersion. The dispersion was coated on entire surface of a zinc plate of 0.2 mm thick by a spin coating method; the coating was about 5 μm thick and as white as conventional papers.

Next, the display electrode and the counter electrode were laminated with a spacer of 50 μm thick interposing between the two electrodes to prepare a cell. An electrolyte solution, consisting of 0.2 mole/liter of lithium perchlorate in propylene carbonate solvent, was forced to flow into the cell to form a multicolor display element of reflective type.

The resulting multicolor display element was evaluated in terms of white reflectance by way of irradiating a diffuse light using a spectrophotometric calorimeter. In a condition that no voltage was applied between the two electrodes, the white reflectance was as high as about 60%. On the other hand, in a condition that the display electrode was connected to a negative electrode and the counter electrode was connected to a positive electrode, and a charge of 20 mC was applied by applying a voltage of 2.0 volts between the two electrodes, then the display electrode colored into red-violet. It was confirmed that the color was derived from the coloring of the EC1 within the display electrode; and the EC2 within the display electrode was not colored in the condition. When a voltage of −3.0 volts was applied between the two electrodes for one second, the red-violet color of the display electrode was extinguished and the display electrode was returned into white.

Example 2

Using the multicolor display element of Example 1, the display electrode was connected to a negative electrode and the counter electrode was connected to a positive electrode, then a charge of 20 mC was applied by applying a voltage of 2.0 volts between the two electrodes; consequently, the display electrode was colored into dark violet, which was confirmed due to the coloring of EC1 as well as EC2 within the display electrode. Then, a voltage of −3.0 volts was applied between the two electrodes for one second; consequently, the dark violet color of the display electrode was extinguished and the color of the display electrode was returned into white.

Example 3

Using the multicolor display element of Example 1, the display electrode was connected to a negative electrode and the counter electrode was connected to a positive electrode, then a charge of 50 mC was applied by applying a voltage of 3.0 volts between the two electrodes. Consequently, the display electrode was colored into dark violet. Thereafter, a voltage of −1.0 volt was applied to between the two electrodes for one second; consequently, the dark violet color of the display electrode was changed into blue, which was confirmed due to that EC1 was decolored and EC2 was colored.

Then, a voltage of −3.0 volts was applied between the two electrodes for one second; consequently, the blue color was extinguished and the display electrode was returned into white.

Example 4

Initially, a display electrode was prepared as follows: EC1 as an electrochromic compound was dissolved into water to prepare an aqueous solution of EC1 having a concentration of 0.02 mole/liter. Then, titanium oxide fine particles having a primary particle size of 6 nm were dispersed into the aqueous solution of EC1 and also a small amount of surfactant was added to prepare an aqueous dispersion of titanium oxide fine particles, thereby causing adsorption of EC1 onto the titanium oxide fine particles. The amount of the titanium oxide fine particles was 20% by mass in the aqueous solution of EC1.

Further, 1-ethyl-1'-(2-phosphonoethyl)-4,4'-bipyridinium dichloride (hereinafter, referring to as "EC3") as an electrochromic compound was dissolved into ethanol to prepare an ethanol solutions of EC3 having a concentration of 0.02 mole/liter. Then, zirconium oxide fine particles having a primary particle size of 30 nm were dispersed into the ethanol solution of EC3 and also a small amount of surfactant was added to prepare an ethanol dispersion of zirconium oxide fine particles, thereby causing adsorption of EC3 onto the zirconium oxide fine particles. The amount of the zirconium oxide fine particles was 20% by mass in the ethanol solution of EC3.

Separately, a glass substrate was employed on the entire surface of which was coated with a transparent electrode film of tin oxide. The dispersion of titanium oxide fine particles was coated on a part of the glass substrate of 1 cm$^2$ area to a thickness of about 2 μm by a spin coating method, and was subjected to heating at 150° C. for 24 hours. After allowing to cool to room temperature, the dispersion of zirconium oxide fine particles was coated over the same area as the titanium oxide fine particles on the glass substrate to a thickness of about 2 μm by a spin coating method, and was subjected to heating at 150° C. for 24 hours. As a result, a transparent electrode film was obtained on the glass substrate.

A counter electrode was prepared as follows: 5 grams of titanium oxide particles having a primary particle size of 300 nm and 1 gram of a polyethylene resin were dispersed into 10 mililiters of tetrahydrofuran to prepare a dispersion. The dispersion was coated on entire surface of a zinc plate of 0.2 mm thick by a spin coating method; the coating was about 5 μm thick and as white as conventional papers.

Next, the display electrode and the counter electrode were laminated with a spacer of 50 μm thick interposing between the two electrodes to prepare a cell. An electrolyte solution, consisting of 0.2 mole/liter of lithium perchlorate in propylene carbonate solvent, was forced to flow into the cell to form a multicolor display element of reflective type.

The resulting multicolor display element was evaluated in terms of white reflectance by way of irradiating a diffuse light using a spectrophotometric colorimeter. In a condition that no voltage was applied between the two electrodes, the white reflectance was as high as about 60%. On the other hand, in a condition that the display electrode was connected to a negative electrode and the counter electrode was connected to a positive electrode, and a voltage of 1.0 volt was applied between the two electrodes for one second, then the display electrode was colored into red-violet. It was confirmed that the color was derived from the coloring of the EC1 within the display electrode; the EC3 within the display electrode was not colored in the condition. When a voltage of −3.0 volts was applied between the two electrodes for one second, the red-violet color of the display electrode was extinguished and the display electrode was returned into white.

Example 5

Using the multicolor display element of Example 4, the display electrode was connected to a negative electrode and the counter electrode was connected to a positive electrode, then a voltage of 3.0 volts was applied between the two electrodes for one second; consequently, the display electrode was colored into dark violet. The color was confirmed due to the coloring of EC1 as well as EC3 within the display electrode. Then, a voltage of −3.0 volts was applied between the two electrodes for one second; consequently, the dark violet color of the display electrode was extinguished and the color of the display electrode was returned into white.

Example 6

Using the multicolor display element of Example 4, the display electrode was connected to a negative electrode and the counter electrode was connected to a positive electrode, then a voltage of 3.0 volts was applied between the two electrodes for one second; consequently, the display electrode was colored into dark violet. Then, a voltage of −1.0 volt was applied between the two electrodes for one second; consequently, the color of the display electrode changed from dark violet into blue, which was confirmed due to that the coloring of the EC1 as well as EC3 turned into coloring of EC1 and decoloring of EC3. Then, a voltage of −3.0 volts was applied between the two electrodes for one second; consequently, the blue color was extinguished and the color of the display electrode was returned into white.

Example 7

Using the multicolor display element of Example 4, the display electrode was connected to a negative electrode and the counter electrode was connected to a positive electrode, then a voltage of 3.0 volts was applied between the two electrodes for one second; consequently, the display electrode was colored into dark violet. Then, then a voltage of −1.0 volt was applied between the two electrodes for one second; consequently, the display electrode was changed into blue. Further, a voltage of 1.0 volt was applied between the two electrodes for one second; consequently, EC3 was colored again and the display electrode was changed into dark violet. Thereafter, a voltage of −3.0 volts was applied between the two electrodes for one second; consequently, all colors were extinguished and the display electrode was returned into white.

Example 8

Using the multicolor display element of Example 4, the display electrode was connected to a negative electrode and the counter electrode was connected to a positive electrode, then a charge of 30 mC was applied by applying a voltage of 1.0 volt between the two electrodes; consequently, the display electrode was colored into red-violet. The color was confirmed due to the coloring of EC1; and EC3 was not colored under the condition. Then, a voltage of −3.0 volts was applied between the two electrodes for one second; consequently, the red-violet color was extinguished and the display electrode was returned into white.

Example 9

Using the multicolor display element of Example 4, the display electrode was connected to a negative electrode and the counter electrode was connected to a positive electrode, then a charge of 10 mC was applied by applying a voltage of 3.0 volts between the two electrodes; consequently, the display electrode was colored into blue. The color was confirmed due to the coloring of EC3; and EC1 was scarcely colored under the condition. Then, a voltage of −3.0 volts was applied between the two electrodes for one second; consequently, the blue color was extinguished and the display electrode was returned into white.

Example 10

Using the multicolor display element of Example 4, the display electrode was connected to a negative electrode and the counter electrode was connected to a positive electrode, then a charge of 50 mC was applied by applying a voltage of 3.0 volts between the two electrodes; consequently, the display electrode was colored into dark-violet. The color was confirmed due to the coloring of EC1 as well as EC3. Then, a voltage of −3.0 volts was applied between the two electrodes for one second; consequently, the dark-violet color was extinguished and the display electrode was returned into white.

Example 11

Initially, a display electrode was prepared as follows: EC1 as an electrochromic compound was dissolved into water to prepare an aqueous solution of EC1 having a concentration of 0.02 mole/liter. Then, titanium oxide fine particles having a primary particle size of 6 nm were dispersed into the aqueous solution of EC1 and also a small amount of surfactant was added to prepare an aqueous dispersion of titanium oxide fine particles, thereby causing adsorption of EC1 onto the titanium oxide fine particles. The amount of the titanium oxide fine particles was 20% by mass in the aqueous solution of EC1.

Further, EC2 as an electrochromic compound was dissolved into ethanol to prepare an ethanol solution of EC2 having a concentration of 0.02 mole/liter. Then, titanium oxide fine particles having a primary particle size of 6 nm, on which surface aluminum oxide and zirconium oxide being coated i.e. the surface being modified, were dispersed into the ethanol solution of EC2 and also a small amount of surfactant was added to prepare an ethanol dispersion of surface modified titanium oxide fine particles, thereby causing adsorption of EC2 onto the surface modified titanium oxide fine particles. The mass ratio of titanium oxide/aluminum oxide/zirconium oxide was 80/15/5 in the surface modified titanium oxide fine particles. The amount of the surface modified titanium oxide fine particles was 20% by mass in the ethanol solution of EC2.

Separately, a glass substrate was employed on the entire surface of which was coated with a transparent electrode film of tin oxide. The aqueous dispersion of titanium oxide fine particles was coated on a part of the glass substrate of 1 cm² area to a thickness of about 2 μm by a spin coating method, and was subjected to heating at 150° C. for 24 hours. After allowing to cool to room temperature, the ethanol dispersion of surface modified titanium oxide fine particles was coated over the same area as the titanium oxide fine particles on the glass substrate to a thickness of about 2 μm by a spin coating method, and was subjected to heating at 150° C. for 24 hours. As a result, a transparent electrode film was obtained on the glass substrate.

A counter electrode was prepared as follows: a 40% aqueous dispersion of tin oxide fine particles having a primary particle size of 30 nm was coated on entire surface of a glass substrate, on which transparent film of tin oxide being coated entirely, by a spin coating method, then the glass substrate was sintered at 450° C. for 1 hour.

Next, the display electrode and the counter electrode were laminated with a spacer of 75 μm thick interposing between the two electrodes to prepare a cell. An electrolyte solution, consisting of 0.2 mole/liter of lithium perchlorate in propylene carbonate solvent and 50% of titanium oxide particles having a primary particle size of 300 nm, was prepared, and the electrolyte was forced to flow into the cell to form a multicolor display element of reflective type.

The resulting multicolor display element was evaluated in terms of white reflectance by way of irradiating a diffuse light using a spectrophotometric calorimeter. In a condition that no voltage was applied between the two electrodes, the white reflectance was as high as about 60%.

Example 12

Using the multicolor display element of Example 11, the display electrode was connected to a negative electrode and the counter electrode was connected to a positive electrode, then a voltage of 3.0 volts was applied between the two electrodes for one second; consequently, the display electrode was colored into dark violet, which was confirmed due to coloring of EC1 as well as EC2. Then, then a voltage of −1.5 volts was applied between the two electrodes for one second; consequently, only EC1 was decolored and the display electrode was changed into blue. Further, a voltage of −4.5 volts was applied between the two electrodes for one second; consequently, EC2 was also decolored and the display electrode was returned into white.

What is claimed is:

1. A multicolor display element, comprising:
   a display electrode,
   a counter electrode,
   an electrolyte, and
   a display layer,
   wherein the counter electrode is disposed oppositely to the display electrode, the electrolyte is filled into a space provided between the display electrode and the counter electrode,
   the display layer is disposed on the surface, which faces the counter electrode, of the display electrode,
   the display layer contains plural electrochromic compositions in a condition that the plural electrochromic compositions are separated into plural layers within the display layer or are mixed together within the display layer, wherein the plural electrochromic compositions are each capable of coloring differently, and represent the following relations:

$|Vc(E1)| > |Vc(E2)| > \ldots > |Vc(Ei)| > \ldots > |Vc(En)|$, and $|Qc(E1)| < |Qc(E2)| < \ldots < |Qc(Ei)| < \ldots < |Qc(En)|$ Ei: "i" th electrochromic composition,
   n: total number of electrochromic compositions,
   Vc(Ei): threshold voltage for coloring condition in terms of "i" th electrochromic composition,
   Qc(Ei): charge amount required for coloring into sufficient color density in terms of "i" th electrochromic composition; and
   at least one of threshold voltage for coloring condition, threshold voltage for decoloring condition, charge amount required for coloring into a sufficient color density, and charge amount required for sufficiently decoloring, are substantially different each other between the plural electrochromic compositions.

2. The multicolor display element according to claim 1, wherein the plural electrochromic compositions are each capable of coloring differently, and represent the following relations:

$$Vc(E1) > Vc(E2) > \ldots > Vc(Ei) > \ldots > Vc(En) >$$

$$Vd(En) > \ldots > Vd(Ei) > \ldots > Vd(E2) > Vd(E1)$$

Ei: "i" th electrochromic composition,
n: total number of electrochromic compositions,
Vc(Ei): threshold voltage for coloring condition in terms of "i" th electrochromic composition,
Vd(Ei): threshold voltage for decoloring condition in terms of "i" th electrochromic composition.

3. The multicolor display element according to claim 1, wherein the plural electrochromic compositions are each capable of coloring differently, and represent the following relations:

$$Vc(E1) < Vc(E2) < \ldots < Vc(Ei) < \ldots < Vc(En) <$$

$$Vd(En) < \ldots < Vd(Ei) < \ldots < Vd(E2) < Vd(E1)$$

Ei: "i" th electrochromic composition,
n: total number of electrochromic compositions,
Vc(Ei): threshold voltage for coloring condition in terms of "i" th electrochromic composition,
Vd(Ei): threshold voltage for decoloring condition in terms of "i" th electrochromic composition.

4. The multicolor display element according to claim 1, wherein the multicolor display element comprises three species of electrochromic compositions that color yellow, magenta, and cyan respectively.

5. The multicolor display element according to claim 1, wherein the electrochromic composition is formed of conductive or semiconductive fine particles that bear an organic electrochromic compound.

6. The multicolor display element according to claim 1, wherein the display layer is formed into an optional pattern.

7. The multicolor display element according to claim 1, wherein a white reflective layer is provided between the display electrode and the counter electrode.

8. The multicolor display element according to claim 1, wherein the electrolyte contains fine pigment particles.

9. The multicolor display element according to claim 1, wherein a driving element is disposed on one of a substrate of the display electrode and a substrate of the counter electrode.

10. A multicolor display element, comprising:
a display electrode,
a counter electrode,
an electrolyte, and
a display layer,
wherein the counter electrode is disposed oppositely to the display electrode, the electrolyte is filled into a space provided between the display electrode and the counter electrode,
the display layer is disposed on the surface, which faces the counter electrode, of the display electrode,
the display layer contains plural electrochromic compositions in a condition that the plural electrochromic compositions are separated into plural layers within the display layer or are mixed together within the display layer,
wherein the plural electrochromic compositions are each capable of coloring differently, and represent the following relations:

$$|Vc(E1)| > |Vc(E2)| > \ldots > |Vc(Ei)| > \ldots > |Vc(En)|,$$

$$|Qc(E1)| > |Qc(E2)| > \ldots > |Qc(Ei)| > \ldots > |Qc(En)|,$$
and $$|Qc'(E1)| > |Qc'(E2)| > \ldots > |Qc'(Ei)| > \ldots > |Qc'(En)|,$$

Ei: "i" th electrochromic composition,
n: total number of electrochromic compositions,
Vc(Ei): threshold voltage for coloring condition in terms of "i" th electrochromic composition,
Qc(Ei): charge amount required for coloring into sufficient color density in terms of "i" th electrochromic composition,
Qc'(Ei): charge amount required for sufficiently decoloring in terms of "i" th electrochromic composition; and
at least one of threshold voltage for coloring condition, threshold voltage for decoloring condition, charge amount required for coloring into a sufficient color density, and charge amount required for sufficiently decoloring, are substantially different each other between the plural electrochromic compositions.

11. The multicolor display element according to claim 10, wherein the multicolor display element comprises three species of electrochromic compositions that color yellow, magenta, and cyan respectively.

12. The multicolor display element according to claim 10, wherein the electrochromic composition is formed of conductive or semiconductive fine particles that bear an organic electrochromic compound.

13. The multicolor display element according to claim 10, wherein the display layer is formed into an optional pattern.

14. The multicolor display element according to claim 10, wherein a white reflective layer is provided between the display electrode and the counter electrode.

15. The multicolor display element according to claim 10, wherein the electrolyte contains fine pigment particles.

16. The multicolor display element according to claim 10, wherein a driving element is disposed on one of a substrate of the display electrode and a substrate of the counter electrode.

17. A multicolor display element, comprising:
a display electrode,
a counter electrode,
an electrolyte,
a display layer, and
a white reflective layer between the display electrode and the counter electrode,
wherein the counter electrode is disposed oppositely to the display electrode, the electrolyte is filled into a space provided between the display electrode and the counter electrode,
the display layer is disposed on the surface, which faces the counter electrode, of the display electrode,
the display layer contains plural electrochromic compositions in a condition that the plural electrochromic compositions are separated into plural layers within the display layer or are mixed together within the display layer,
wherein the plural electrochromic compositions are each capable of coloring differently, and represent the following relations:

$$|Vc(E1)| > |Vc(E2)| > \ldots > |Vc(Ei)| > \ldots > |Vc(En)|, \text{ and}$$

$$|Qc(E1)| > |Qc(E2)| > \ldots > |Qc(Ei)| > \ldots > |Qc(En)|$$

Ei: "i" th electrochromic composition,
n: total number of electrochromic compositions,
Vc(Ei): threshold voltage for coloring condition in terms of "i" th electrochromic composition,
Qc(Ei): charge amount required for coloring into sufficient color density in terms of "i" th electrochromic composition; and
at least one of threshold voltage for coloring condition, threshold voltage for decoloring condition, charge amount required for coloring into a sufficient color density, and charge amount required for sufficiently decoloring, are substantially different each other between the plural electrochromic compositions.

18. The multicolor display element according to claim 17, wherein the plural electrochromic compositions are each capable of coloring differently, and represent the following relations:

$$|Qc(E1)|>|Qc(E2)|>\ldots|Qc(Ei)|>\ldots>|Qc(En)|, \text{ and}$$

$$|Qc'(E1)|>|Qc'(E2)|>\ldots>|Qc'(Ei)|>\ldots>|Qc'(En)|$$

Ei: "i" th electrochromic composition,
n: total number of electrochromic compositions,
Qc(Ei): charge amount required for coloring into sufficient color density in terms of "i" th electrochromic composition, and
Qc'(Ei): charge amount required for sufficiently decoloring in terms of "i" th electrochromic composition.

19. The multicolor display element according to claim 17, wherein the multicolor display element comprises three species of electrochromic compositions that color yellow, magenta, and cyan respectively.

20. The multicolor display element according to claim 17, wherein the electrochromic composition is formed of conductive or semiconductive fine particles that bear an organic electrochromic compound.

21. The multicolor display element according to claim 17, wherein the display layer is formed into an optional pattern.

22. The multicolor display element according to claim 17, wherein the electrolyte contains fine pigment particles.

23. The multicolor display element according to claim 17, wherein a driving element is disposed on one of a substrate of the display electrode and a substrate of the counter electrode.

* * * * *